United States Patent
Lin et al.

(10) Patent No.: US 9,507,723 B2
(45) Date of Patent: Nov. 29, 2016

(54) METHOD FOR DYNAMICALLY ADJUSTING A CACHE BUFFER OF A SOLID STATE DRIVE

(71) Applicant: QUANTA STORAGE INC., Taoyuan (TW)

(72) Inventors: Cheng-Yi Lin, Taoyuan (TW); Yi-Long Hsiao, Taoyuan (TW)

(73) Assignee: QUANTA STORAGE INC., Taoyuan (TW)

( * ) Notice: Subject to any disclaimer, the term of this patent is extended or adjusted under 35 U.S.C. 154(b) by 11 days.

(21) Appl. No.: 14/670,401

(22) Filed: Mar. 26, 2015

(65) Prior Publication Data

US 2016/0062898 A1     Mar. 3, 2016

(30) Foreign Application Priority Data

Aug. 28, 2014   (CN) .......................... 2014 1 0430802

(51) Int. Cl.
  *G06F 12/00*   (2006.01)
  *G06F 12/08*   (2016.01)
(52) U.S. Cl.
  CPC ....... *G06F 12/0873* (2013.01); *G06F 12/0866* (2013.01); *G06F 12/0871* (2013.01); *G06F 2212/214* (2013.01); *G06F 2212/461* (2013.01); *G06F 2212/604* (2013.01); *G06F 2212/608* (2013.01)
(58) Field of Classification Search
  CPC ... G06F 12/00; G06F 12/0238; G06F 3/0679

USPC .................................................. 711/103, 154
  See application file for complete search history.

(56) References Cited

U.S. PATENT DOCUMENTS

| | | | | |
|---|---|---|---|---|
| 6,094,695 A | * | 7/2000 | Kornher | G06F 5/065 710/56 |
| 7,609,708 B2 | * | 10/2009 | Soo | G06F 13/385 370/412 |
| 8,458,393 B2 | * | 6/2013 | Tzeng | G06F 12/08 711/103 |
| 2004/0131055 A1 | * | 7/2004 | Calderon | G06F 12/023 370/381 |
| 2008/0229050 A1 | * | 9/2008 | Tillgren | G06F 1/3225 711/200 |
| 2009/0010437 A1 | * | 1/2009 | Takashima | G11B 20/00086 380/277 |
| 2010/0023682 A1 | * | 1/2010 | Lee | G06F 12/0246 711/103 |
| 2015/0277802 A1 | * | 10/2015 | Oikarinen | G06F 3/0631 711/114 |

* cited by examiner

*Primary Examiner* — Tuan Thai
(74) *Attorney, Agent, or Firm* — Winston Hsu; Scott Margo

(57) ABSTRACT

A method for dynamically adjusting a cache buffer of a solid state drive includes receiving data, determine if the data are continuous according to logical allocation addresses of the data, increasing a memory size of the cache buffer, searching the cache buffer for same data as at least one portion of the data, modifying and merging of the at least one portion of the data with the same data already temporarily stored in the cache buffer, temporarily storing the data in the cache buffer.

8 Claims, 6 Drawing Sheets

Data received from the host :
LAA(1, 3, 5, 8, 10)
Continuity of data: LAA not continuous
Decrease the number of cache memory units of the cache buffer Sets of data :                          5 sets
Search done for each set of data :      6 times
Total number of searches :              30 times Data received from the host :
LAA(11, 12, 13, 14, 15)
Continuity of data: LAA continuous
Increase the number of cache memory units of the
cache buffer Sets of data :                          5sets
Number of search :                      14 sets
Total number of searches :              14sets Data received from the host :
LAA(1, 3, 5, 15, 10, 11, 12, 13, 14, 15)
Continuity of data: LAA(1, 3, 5, 15) not continuous
LAA(10, 11, 12, 13, 14, 15)continuous
Decrease the number of cache memory units of the
cache buffer, write not continuous data Increase the number of cache memory units of the
cache buffer, write continuous data

METHOD FOR DYNAMICALLY ADJUSTING A CACHE BUFFER OF A SOLID STATE DRIVE

BACKGROUND OF THE INVENTION

1. Field of the Invention

The present invention presents a method for dynamically adjusting a cache buffer of a solid state drive, and more particularly, a method for managing a cache buffer of a solid state drive by determining if data are continuous and dynamically adjusting the cache buffer when writing the data.

2. Description of the Prior Art

A solid state drive (SSD) conventionally has a number of NAND flash memories combined to form a storage device. The solid state drive has a fixed structure making it suitable to be carried around making transfer of data fast. Thus, the solid state drive is a popular product for transferring large amounts of data.

FIG. 1 illustrates a flowchart of a method of writing data in a solid state drive (SSD) according to prior art. The solid state drive of the prior art receives data having a logical block address (LBA) transmitted from a host, converts the data to logical page data format having logical allocation address (LAA), and temporarily stores the data in a cache buffer (step P1). The cache buffer is searched for same data (step P2). Determine if there is same data (step P3). When there is same data, the same data and the data are merged (step P4). The logical page is randomly allocated to a flash memory and the allocation registered in a mapping table (step P5). Individually transmitting the logical page to the flash memory through a first in first out pipeline and writing the logical page in a memory page of a flash memory (step P6). Thus, the solid state drive of the prior art uses the data temporarily stored in the cache buffer to search for the same data. And, the same data are merged with the data to reduce writing of repeated data to increase the efficiency of writing data.

Then, when the solid state drive of the prior art searches for the same data in the cache buffer, all of the data temporarily stored in the cache buffer has to be searched and compared. If the memory size of the cache buffer is too big, an amount of time is wasted to do the comparison of the temporarily stored data. Thus, the efficiency of writing data is decreased. But, when the predetermined memory size of the cache buffer is too small, because the cache memory is not able to accumulate more temporarily stored data, the chance to find same data during search is reduced. Thus, result in writing of repeated data and the efficiency of writing data is decreased. Therefore, there are still problems to be solved in regard to the solid state drive setting the memory size of the cache buffer.

SUMMARY OF THE INVENTION

An objective of the present invention is to present a method for dynamically adjusting a cache buffer of a solid state drive. When logical allocation addresses of data received are determined to be continuous, a memory size of the cache memory of the solid state drive is dynamically increased to be able to temporarily store more data and increase the chance of finding same data. Thus, the chance of writing repeated data is reduced.

Another objective of the present invention is to present a method for dynamically adjusting a cache buffer of a solid state drive. When logical allocation addresses of data received are determined to be not continuous, a memory size of the cache memory of the solid state drive is dynamically decreased to decrease number of searches and comparisons to be made on the temporarily stored data of the cache buffer. Thus, the efficiency of writing data is increased.

To achieve the objective of the present invention, the method for dynamically adjusting the cache buffer of the solid state drive comprises receiving data, determining if received data are continuous according to logical allocation addresses of the data, increasing a memory size of the cache buffer, searching the cache buffer for same data as at least one portion of the data, modifying and merging of the at least one portion of the data with the same data already temporarily stored in the cache buffer, and temporarily storing the data in the cache buffer.

The method for dynamically adjusting the cache buffer of the solid state drive increases the memory size of the cache buffer by increasing the number of cache memory units of the cache buffer by a predetermined number. The predetermined number is a fixed integer or any integer. If the data are determined to be not continuous, memory size of the cache buffer is decreased by decreasing the number of cache memory units of the cache buffer by a predetermined number. The cache buffer is searched for same data as at least one portion of the data according to logical allocation addresses of the data. When the data are continuous, the cache buffer is searched for same data as the data by comparing the logical allocation addresses of the data by block. When there is no same data, the data are temporarily stored in the cache buffer.

These and other objectives of the present invention will no doubt become obvious to those of ordinary skill in the art after reading the following detailed description of the preferred embodiment that is illustrated in the various figures and drawings.

DETAILED DESCRIPTION

To achieve the objective of the present invention, preferred embodiments of the present invention are described in the following paragraphs together with some illustrations.

Figure 1:
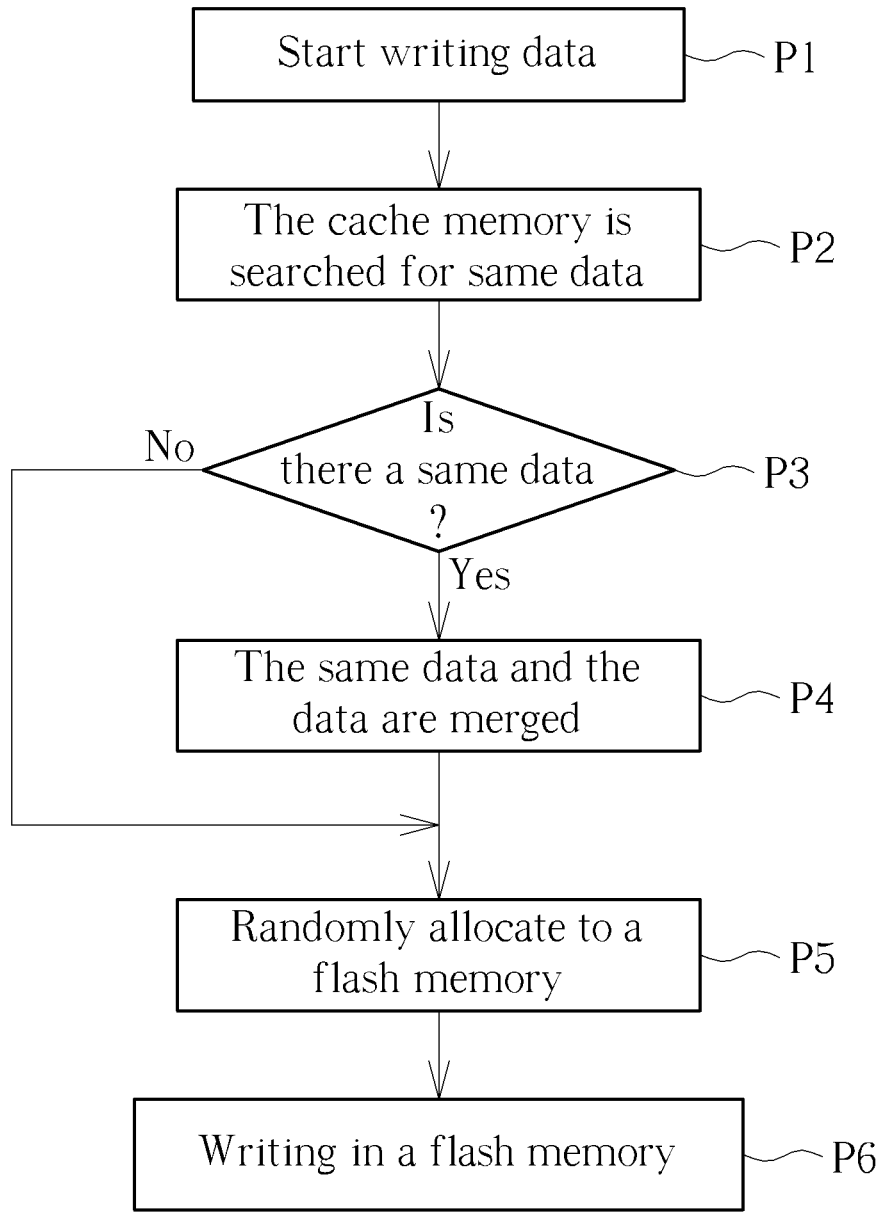
FIG. 1 illustrates a flowchart of a method of writing data in a solid state drive (SSD) according to prior art.
Figure 2:
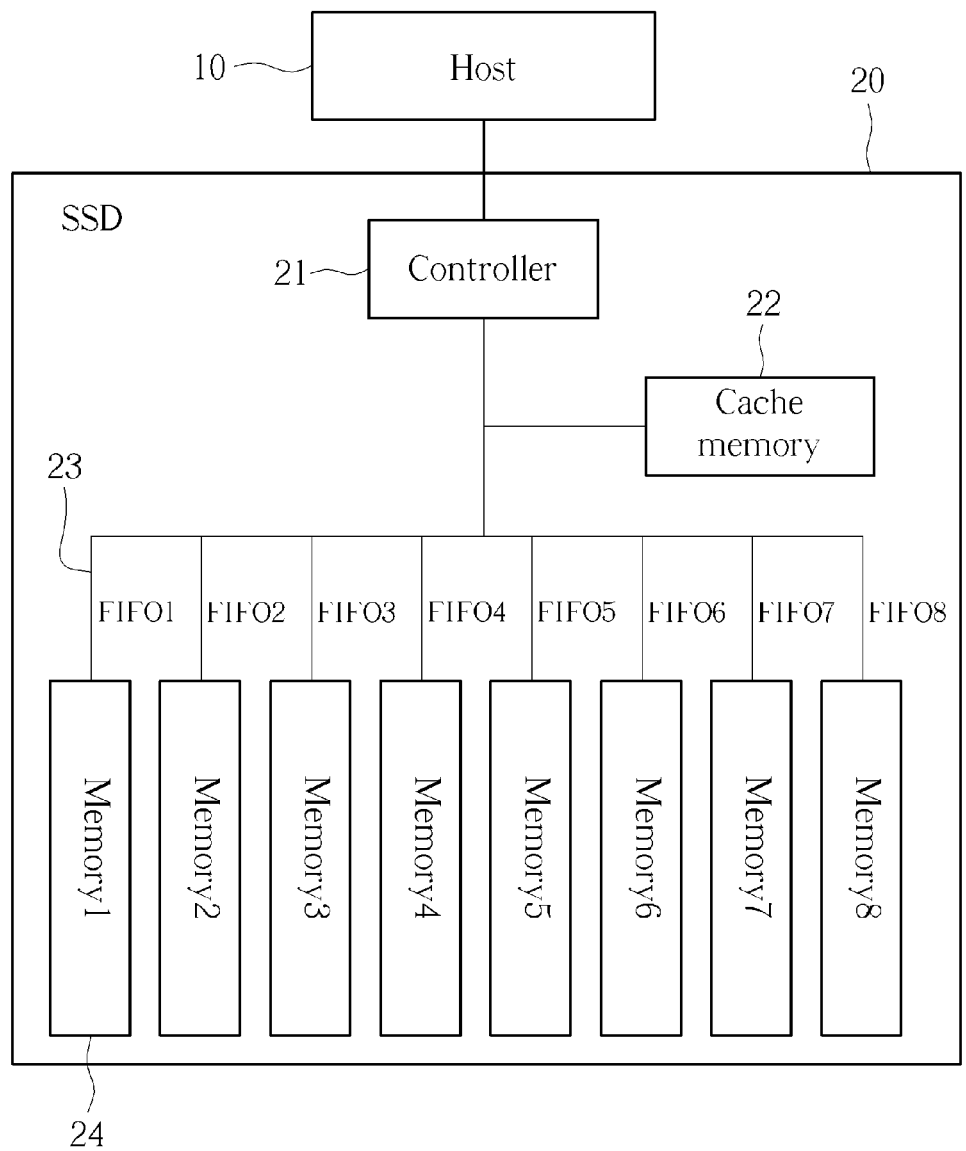
FIG. 2 illustrates a structure of a system of a solid state drive (SSD) according to an embodiment of the present invention.

FIG. 2 illustrates a structure of a system of a solid state drive (SSD) 20 according to an embodiment of the present invention. The solid state drive 20 may be a conventional solid state drive. A host 10 may be connected to a controller 21 of the solid state drive 20. The controller 21 in coordination with a cache buffer 22 may be used to control a plurality of memory 24 having one to one correspondence with a plurality of first in first out pipelines 23. The above described configuration may form a storage device used to receive data from the host 10 and maybe used by the host 10 as a main storage device.

When the solid state disk 20 receives data having a logical block address (LBA) from the host 10, the data may be converted to a data format having a logical allocation address (LAA). The logical allocation address may be the allocation address of the data in the solid state drive 20. The data maybe temporarily stored in the cache buffer 22 to wait to be written in the memory 24.

Figure 3:
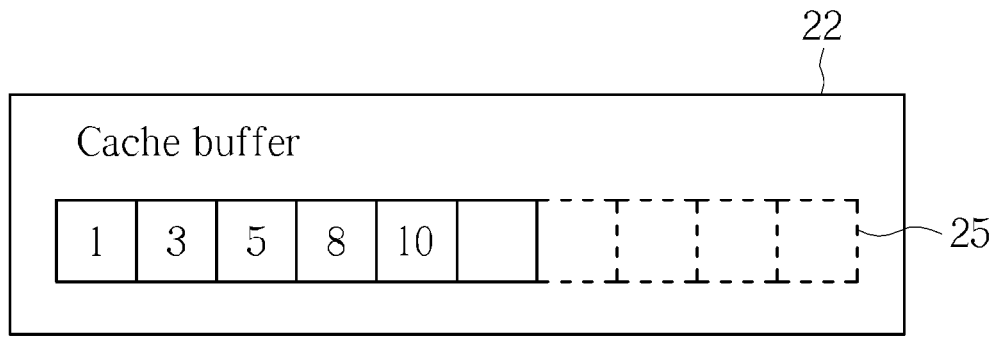
FIG. 3 illustrates a diagram of reducing size of a cache buffer of a solid state drive according to an embodiment of the present invention.

FIG. 3 illustrates a diagram of reducing size of a cache buffer of a solid state drive according to an embodiment of the present invention. The solid state drive may compare data received from the host to data temporarily stored in the cache buffer 22. When five sets of data LAA(1), LAA(3), LAA(5), LAA(8), and LAA(10) are received, a controller of a solid state disk of prior art compares the data received from the host to data on each of the cache memory unit 25 of the cache buffer 22 one by one. If the cache buffer 22 has ten cache memory units 25, each of the sets of data is compared up to ten times. Thus, for five sets of data, the controller needs to perform up to fifty comparisons with data temporarily stored the cache memory units 25. The controller of the solid state device of the present invention may determine the five sets of data received from the host are not continuous according to the logical allocation addresses of the five sets of data. The cache buffer 22 may be reduced by a predetermined number of cache memory units 25. If four cache memory units 25 are removed (as shown in FIG. 3) from the cache buffer 22, the ten cache memory units 25 of the cache buffer 22 may be reduced to six cache memory units 25. When the data LAA(1) is transmitted to the solid state drive, the controller may search and compare the data LAA(1) in the six cache memory units 25 of the cache buffer 22. Up to six comparisons may be performed. When a cache memory unit is determined to be empty, the data LAA(1) may be temporarily stored in the empty cache memory unit 25. The same process may be performed when data LAA(3), LAA(5), LAA(8), and LAA(10) are transmitted to the solid state disk. Each set of data may result in performing up to six comparisons. The total number of comparison for the five sets of data may be thirty. And, each set of data LAA(3), LAA(5), LAA(8), and LAA(10) may temporarily be stored in a cache memory unit 25. When the solid state drive of the present invention determines that the logical allocation addresses of the data are not continuous and the cache buffer 22 is dynamically reduced by a predetermined number of cache memory units 25, the number of times the cache memory units 25 of the cache buffer 22 is searched for same data may be reduced. Thus, the speed of writing data is increased and the efficiency of writing data in the solid state disk.

Figure 4:
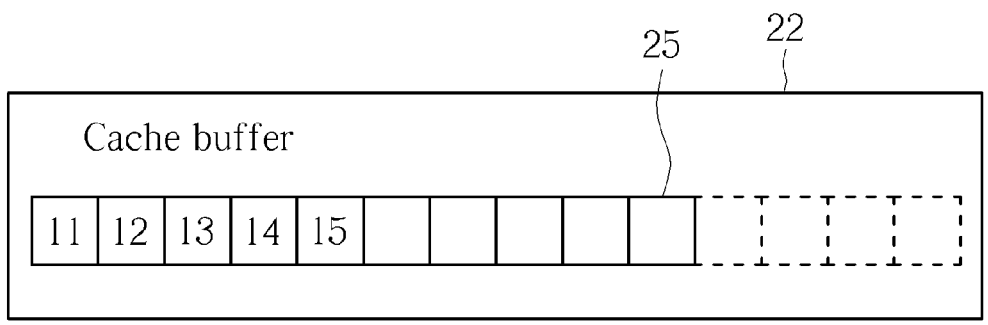
FIG. 4 illustrates a diagram of increasing size of a cache buffer of a solid state drive according to an embodiment of the present invention.

FIG. 4 illustrates a diagram of increasing size of a cache buffer of a solid state drive according to an embodiment of the present invention. The solid state drive may receive data from the host. Five sets of data LAA(11), LAA(12), LAA (13), LAA(14), and LAA(15) may be received. The controller of the solid state device of the present invention may determine the five sets of data received from the host are continuous according to the logical allocation addresses of the five sets of data. The cache buffer 22 may be increased by a predetermined number of cache memory units 25. If four cache memory units 25 are added (as shown in FIG. 4) to the cache buffer 22, the ten cache memory units 25 of the cache buffer 22 may be increased to fourteen cache memory units 25. When data are transmitted to the solid state drive, the controller may search and compare the received data to the data in the fourteen cache memory units 25 of the cache buffer 22 according to the continuous logical allocation addresses of the received data. When cache memory units 25 of the cache buffer 22 are determined to be empty, the sets of data LAA(11), LAA(12), LAA(13), LAA(14), and LAA (15) may be temporarily stored one by one to the cache memory units 25. The controller of the solid state device of the present invention may search and compare the data in the cache memory units 25 of the cache buffer 22 to the five continuous sets of data for a total of fourteen times. When the solid state drive of the present invention determines that the logical allocation addresses of the data are continuous and the cache buffer 22 is dynamically increased by the predetermined number of cache memory units 25, there may be no increase in the number of times the cache memory units 25 of the cache buffer 22 is searched and the accumulated data temporarily stored in the cache buffer 22 maybe increased. Thus, the chance of finding repeated data maybe increased and the writing of repeated data maybe reduced to increase the efficiency of writing data.

Figure 5:
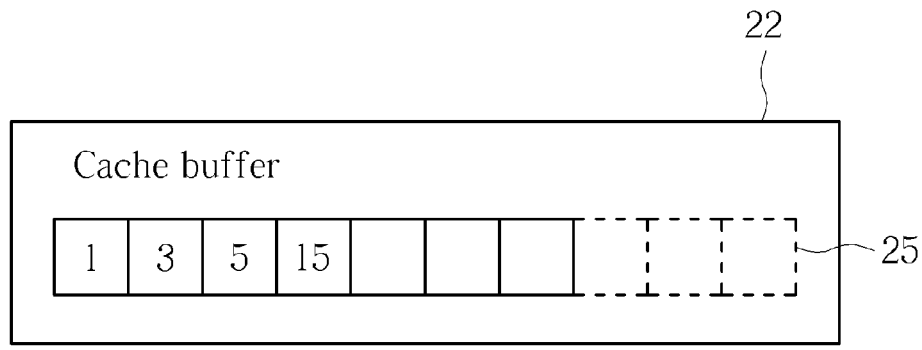
FIG. 5 illustrates a diagram of dynamically adjusting size of a cache buffer of a solid state drive according to an embodiment of the present invention.
Figure 5:
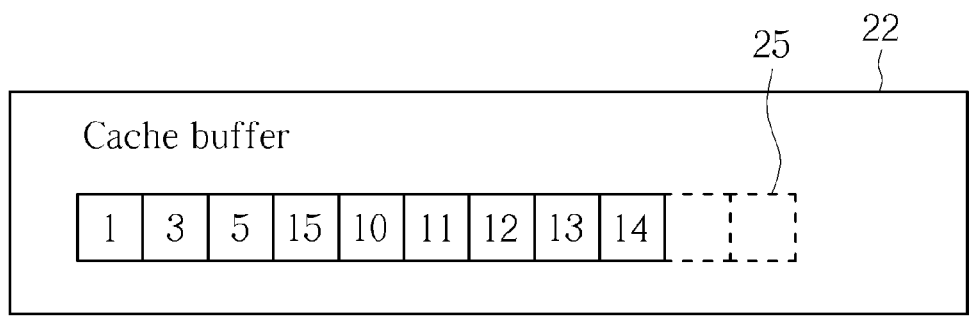

FIG. 5 illustrates a diagram of dynamically adjusting size of a cache buffer of a solid state drive according to an embodiment of the present invention. The solid state drive may receive data from the host. Ten sets of data LAA(1), LAA(3), LAA(5), LAA(15), LAA(10), LAA(11), LAA(12), LAA(13), LAA(14), and LAA(15) may be received. The controller of the solid state device may determine which of the ten sets of data received from the host are not continuous and which sets of data are continuous according to the logical allocation addresses of the five sets of data. The sets of data which are not continuous may include LAA(1), LAA(3), LAA(5), and LAA(15). The sets of data which are continuous may include LAA(10), LAA(11), LAA(12), LAA(13), LAA(14), and LAA(15). When the not continuous sets of data LAA(1), LAA(3), LAA(5), and LAA(15) are received first, the cache buffer 22 may be reduced by a predetermined number of cache memory units 25. If three cache memory units 25 are removed (as shown in FIG. 5) from the cache buffer 22, the ten cache memory units 25 of the cache buffer 22 may be reduced to seven cache memory units 25 to reduce the time it takes to search and compare for same data. After searching and comparing of data, the not continuous sets of data LAA(1), LAA(3), LAA(5), and LAA(15) may be temporarily stored in the cache memory units 25 of the cache buffer 22 having a reduced number of cache memory units 25. When the continuous sets of data LAA(10), LAA(11), LAA(12), LAA(13), LAA(14), and LAA(15) are received next, the cache buffer 22 may only have three available cache memory units 25 left. The cache buffer 22 may only have enough available cache memory units 25 to save the sets of data LAA(10), LAA(11), and LAA(12) and the temporarily saved data may need to be written to a non-volatile memory to empty out the cache memory units 25. Thus, the chance to search and compare for same data may be lost. Because the received data are determined to be continuous, the cache buffer 22 may be increased by a predetermined number of cache memory units 25. The predetermined number may be a fixed integer or any integer. If four cache memory units 25 are added (as shown in FIG. 5) to the cache buffer 22, the seven cache memory units 25 of the cache buffer 22 may be increased to eleven cache memory units 25. The cache buffer 22 may be searched for same data as the continuous sets of data LAA(10), LAA(11), LAA(12), LAA(13), LAA(14), and LAA(15). The comparison may find a same data LAA(15).

The data LAA(15) of the continuous sets of data LAA(10), LAA(11), LAA(12), LAA(13), LAA(14), and LAA(15) may be merged with the data LAA(15) temporarily stored in the cache buffer 22. The remaining continuous sets of data LAA (10), LAA(11), LAA(12), LAA(13), and LAA(14) may be temporarily stored to the cache buffer 22 with the increased number of cache memory units 25. The continuous sets of data may be compared to previously received data to reduce the number of comparison. Thus, the controller of the solid state device may determine the continuity of data according to the logical allocation addresses of the data transmitted by the host. The cache buffer of the solid state drive may be dynamically adjusted by increasing the number of cache memory units of the cache buffer. In doing so, the number of temporarily stored data may increase and, thus, increasing the chance of finding same data during search and comparison. The number of times the cache memory units of the cache buffer is searched and compared may be reduced to increase the efficiency of writing data.

Figure 6:
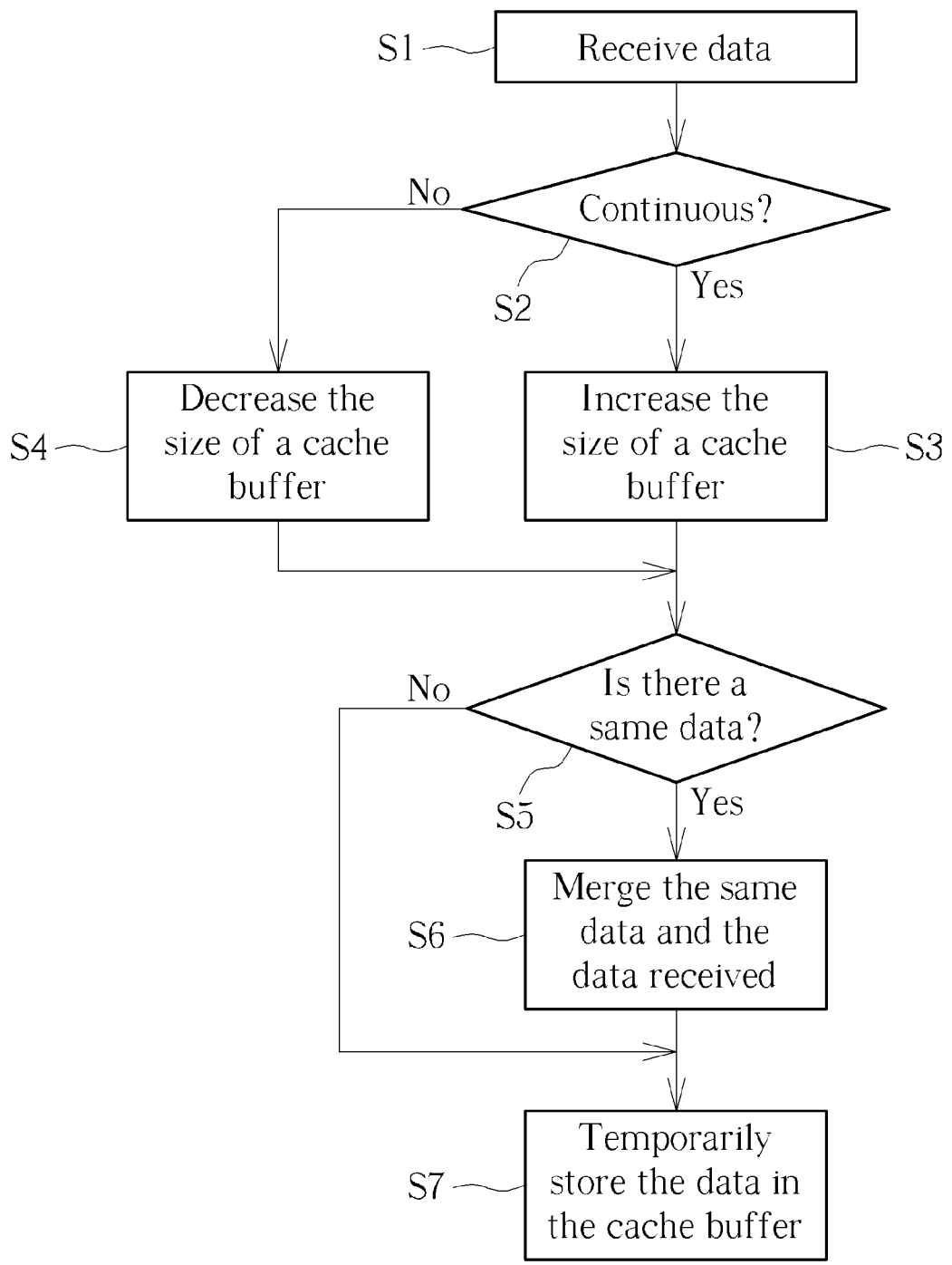
FIG. 6 illustrates a flowchart of a method for dynamically adjusting a cache buffer of a solid state drive according to an embodiment of the present invention.

FIG. 6 illustrates a flowchart of a method for dynamically adjusting a cache buffer of a solid state drive according to an embodiment of the present invention. The method for dynamically adjusting the cache buffer of the solid state drive may include but is not limited to the following steps:

Step S1: the solid state drive receives data having a logical allocation address;

Step S2: determine if the data are continuous according to the logical allocation address; when the data are continuous, go to step S3; when the data are not continuous, go to step S4;

Step S3: increase the size of a cache buffer of the solid state drive by a predetermined memory size; in other words, increase the cache memory by a predetermined number of cache memory units; go to step S5;

Step S4: decrease the size of a cache buffer of the solid state drive by a predetermined memory size; in other words, decrease the cache memory by a predetermined number of cache memory units; go to step S5;

Step S5: search and compare data in the cache buffer with the data received for same data according to the logical allocation address of the data; when there is same data, go to step S6; when there is no same data, go to step S7;

Step S6: merge the same data with the data received; go to step S7; and

Step S7: temporarily store the data in the cache buffer.

According to the above mentioned steps, the method for dynamically adjusting the cache buffer of the solid state drive of the present invention may have the controller of the solid state device of the present invention determine if the data received from the host are continuous according to the logical allocation addresses of the sets of data. The number of cache memory units of the cache memory of the solid state drive is dynamically increased to be able to temporarily store more data and increase the chance of finding same data. And, the cache buffer may be searched for same data as the data by comparing the logical allocation addresses of the data by block to reduce the number of comparisons in the cache memory units of the cache buffer. Or, the number of cache memory units of the cache memory of the solid state drive may be dynamically decreased to decrease the time used for searching and comparison in the cache buffer. Thus, the objective of increasing the efficiency of writing data may be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for dynamically adjusting a cache buffer of a solid state drive, comprising:
  receiving data;
  increasing a memory size of the cache buffer when it is determined that the data are continuous;
  decreasing the memory size of the cache buffer when it is determined that the data are not continuous;
  searching the cache buffer for same data as at least one portion of the data, modifying and merging of the at least one portion of the data with the same data already temporarily stored in the cache buffer; and
  temporarily storing the data in the cache buffer.

2. The method of claim 1, wherein the continuity of the data is determined according to logical allocation addresses of the data.

3. The method of claim 1, wherein increasing the memory size of the cache buffer is increasing the memory size of the cache buffer by increasing the number of cache memory units of the cache buffer by a predetermined number.

4. The method of claim 3, wherein the predetermined number is a fixed integer or any integer.

5. The method of claim 1, wherein decreasing memory size of the cache buffer is decreasing memory size of the cache buffer by decreasing the number of cache memory units of the cache buffer by a predetermined number.

6. The method of claim 1, wherein the same data is determined according to logical allocation addresses of the data.

7. The method of claim 6, wherein when the data are continuous, searching the cache buffer for same data as the data by comparing the logical allocation addresses of the data by block.

8. The method of claim 6, wherein when there is no same data, temporarily storing the data in the cache buffer.

* * * * *